US006934563B2

(12) United States Patent
Raghothaman et al.

(10) Patent No.: US 6,934,563 B2
(45) Date of Patent: Aug. 23, 2005

(54) APPARATUS, AND ASSOCIATED METHOD, FOR SELECTING ANTENNA PATTERN CONFIGURATION TO BE EXHIBITED BY AN ANTENNA ASSEMBLY OF A COMMUNICATION STATION

(75) Inventors: Balaji Raghothaman, Allen, TX (US); Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 478 days.

(21) Appl. No.: 10/080,954

(22) Filed: Feb. 22, 2002

(65) Prior Publication Data

US 2003/0162567 A1 Aug. 28, 2003

(51) Int. Cl.[7] .............................. H04B 1/38; H04M 1/00

(52) U.S. Cl. .................. 455/562.1; 455/63.1; 455/63.4; 455/67.11

(58) Field of Search ................................ 455/562.1, 69, 455/561, 63.1, 63.2, 63.4, 67.11

(56) References Cited

U.S. PATENT DOCUMENTS 6,477,161 B1 * 11/2002 Hudson et al. ............. 370/342
6,487,423 B1 * 11/2002 Johansson ................ 455/562.1
6,584,302 B1 * 6/2003 Hottinen et al. .............. 455/69
6,606,058 B1 * 8/2003 Bonek et al. ............... 342/383
6,615,024 B1 * 9/2003 Boros et al. ............. 455/67.14
6,650,881 B1 * 11/2003 Dogan ..................... 455/276.1
6,671,499 B1 * 12/2003 Ylitalo et al. ............... 455/101
6,694,155 B1 * 2/2004 Chin et al. ............... 455/562.1

* cited by examiner

*Primary Examiner*—Edward F. Urban
*Assistant Examiner*—Blane J. Jackson

(57) ABSTRACT

Apparatus, and an associated method, for facilitating selection of antenna pattern characteristics to be exhibited by an antenna assembly of a communication station, such as a base transceiver station operable in a cellular communication system. Indications of channel conditions on an uplink channel are utilized in the determination of antenna weighting values by which to weight antenna weighting elements of the antenna assembly. In one implementation, an uplink channel correlation matrix is reformulated into vector form to reduce the computational complexity of calculations required to select the antenna weighting values. In another implementation, a discrete Fourier transform operation is performed using fast Fourier transform techniques to select the antenna weighting values.

10 Claims, 4 Drawing Sheets

APPARATUS, AND ASSOCIATED METHOD, FOR SELECTING ANTENNA PATTERN CONFIGURATION TO BE EXHIBITED BY AN ANTENNA ASSEMBLY OF A COMMUNICATION STATION

The present invention relates generally to a manner by which to select an antenna pattern configuration to be exhibited by a first communication station operable to communicate with a second communication station in a two-way radio communication system. More particularly, the present invention relates to apparatus, and an associated method, by which to select the antenna pattern responsive to evaluation of data communicated to the first communication station by the second communication station. When implemented in a frequency division duplex system, data sent to the first communication station upon a communication channel defined about one frequency is evaluated, and, responsive to the evaluations, the antenna pattern configuration is selected for subsequent communication of data by the first communication station upon a communication channel defined about a second frequency. Evaluations are made in manners requiring lessened complexity of computations relative to manners conventionally utilized to select the antenna pattern characteristics.

BACKGROUND OF THE INVENTION

A communication system operates to communicate data between a sending station and a receiving station upon a communication channel. The communication channel connects the sending and receiving stations together. And, the data is communicated by the sending station upon the communication channel to the receiving station. To permit the data to be communicated upon the communication channel, the sending station generally operates first to convert the data into a form amenable to communication of the data upon the communication channel. When delivered at the receiving station, the informational content of the data is recovered.

Communication systems have been developed and implemented to permit the effectuation of many different types of communication services.

A radio communication system is an exemplary type of communication system. In a radio communication system, the communication channel that interconnects the sending and receiving stations is defined upon a radio link extending therebetween. The radio link is defined upon a portion of the electromagnetic spectrum. Because a radio link is used upon which to define the communication channel rather than a wireline connection, a radio communication system can provide communication mobility. A communication system that, instead, utilizes a conventional wireline connection upon which to define the communication channel is typically of limited mobility due to the need to interconnect the sending and receiving stations by way of the conventional wireline connections.

A cellular communication system is a type of radio communication system. The networks of various types of cellular communication systems have been installed throughout significant portions of populated areas of the world. And, cellular communication systems have achieved wide levels of usage by large numbers of users who subscribe pursuant to a subscription service to communicate therethrough.

Communication stations of a radio communication system form radio transceivers capable of both sending and receiving signals upon radio links extending between the radio transceivers. Radio transceivers of the network part of a cellular communication system are referred to as base transceiver stations (BTSs), and radio transceivers carried by subscribers and used by the subscribers to communicate pursuant to a communication session to effectuate a communication service referred to as mobile stations.

Base transceiver stations, as well as other communication stations operable in other communication systems, sometimes include antenna assemblies that permit directional antenna beam patterns to be formed. The creation of directional antenna beam patterns facilitate improved communications in the communication system as directional antenna beam patterns elongated lobes can be formed to increase the communication range between which data can be communicated between a base transceiver station and a mobile station. And, through the use of directional antenna beam patterns, reception of interfering signals can be reduced.

To take advantage best of the selectable nature of an antenna assembly that provides for selectable antenna pattern configurations, a manner is required by which to select the antenna pattern configuration to be exhibited by the antenna assembly pursuant to a particular communication session. In at least one conventional manner by which to select the antenna pattern configuration to be exhibited by the antenna assembly, measurements are made at a communication station, such as a base transceiver station, of channel conditions on a channel upon which data is communicated thereto. That is to say, a base transceiver station detects channel conditions on a reverse link channel based upon detection at the base transceiver station of data communicated thereto by a mobile station. Responsive to the measurements, the antenna pattern configuration subsequently to be exhibited by the antenna assembly of the base transceiver station is selected.

Calculations performed responsive to detection of the data communicated to the base transceiver station upon the reverse link channel, however, are computationally complex. The need to perform numerous computations requires both computational capacity of processing apparatus to perform such computations as well as a computation time period during which to perform the computations. The computation time period might be so long as to prevent the selection of the antenna pattern characteristics to be exhibited by the antenna assembly without delaying subsequent communications pursuant to effectuation of the communication service.

In a communication system which utilizes a frequency division duplex (FDD) communication scheme, the calculations required to be performed include calculations that attempt to correspond channel conditions upon a reverse link channel with channel conditions upon a forward link channel. By making correspondence therebetween, an estimate of the forward link channel is determinable. And, responsive to estimations of the forward link channel, the antenna being patterned is formable in manners expected best to facilitate subsequent communications.

As the computational complexity of the computations required, pursuant to conventional manners by which to select the antenna beam patterns to be exhibited by an antenna assembly might cause time delays limiting the usefulness of the selection, any improved manner that reduces the computational complexity of the computations would be advantageous.

It is in light of this background information related to antenna beam pattern selection that the significant improvements of the present invention have evolved.

SUMMARY OF THE INVENTION

The present invention, accordingly, advantageously provides apparatus, and an associated method, by which to select an antenna pattern configuration to be exhibited by an antenna assembly of a first communication station.

Through operation of an embodiment of the present invention, the antenna pattern configuration is selected responsive to evaluation of data communicated to the first communication station by a second communication station. Evaluations are made in manners that require lessened complexity of computations relative to manners conventionally utilized to select the antenna pattern configuration.

When implemented in a frequency division duplex (FDD) system, data sent to the first communication station upon a communication channel defined about one frequency is evaluated, and, responsive to the evaluations, the antenna pattern configuration is selected for subsequent communications. An antenna pattern configuration is selected to facilitate improved communications to effectuate a communication service pursuant to a communication session between the first and second communication stations.

In one aspect of the present invention, a manner is provided by which to calculate downlink beam forming weights by which to weight antenna elements of an antenna assembly of a base transceiver station, or other communication station, operable in a cellular, or other radio, communication system. Calculations are made responsive to measurements of data communicated to the base transceiver station by a mobile station, or other remote communication station. Computations are made of coefficients of a Fourier series expansion of a channel covariants matrix of a uniform linear array are performed. The computations are of lessened complexity relative to conventional manners by which to calculate the downlink beam forming weights.

In another aspect of the present invention, a manner is provided by which to calculate downlink beam forming weights by which to weight signals applied to antenna elements of an antenna assembly. The weights are calculated responsive to detection of data sent to the base transceiver station upon an uplink channel. A discrete Fourier transform is utilized by which to convert a channel correlation matrix from an uplink correlation matrix to a downlink correlation matrix. Reduced complexity of computations relative to conventional manners by which to select the downlink beam forming weights facilitates quick determination of the downlink beam forming weights to be utilized.

In another aspect of the present invention, an uplink channel correlation matrix is determined at the base transceiver station, or other communication station, that has an antenna assembly capable of exhibiting a selectable antenna pattern configuration. The uplink channel correlation matrix is formed responsive to detection of data communicated to the base transceiver station upon an uplink channel. The uplink channel correlation matrix is reformulated into vector form by stacking the elements of the uplink channel correlation matrix to form a single-column matrix. Once the column matrix forms the vector, and the vector represents a linear system. Coefficient factors of the linear system, in vector form, are determined. The coefficient values are then utilized in the calculation of a corresponding downlink channel correlation matrix. And, responsive to determination of the downlink channel correlation matrix, antenna weightings are selected by which to weight signals that are to be transduced at individual antenna elements of an array of antenna elements of an antenna assembly.

In another aspect of the present invention, an uplink channel correlation matrix is determined responsive to detection at the base transceiver station of data communicated thereto by a mobile station on an uplink channel. The uplink channel correlation matrix is formed, in part, by incident angles defining angles of incidents of incoming rays of the uplink data. The angles of the uplink channel correlation matrix are multiplied by a multiplier, and the resultant product defines a downlink angle. The downlink angles are interpolated to select evenly-spaced frequency values associated with the angles. And, inverse, discrete Fourier transforms are performed upon the evenly-spaced frequency values. And, the transformed values are used to form a downlink channel correlation matrix. Antenna weighting factors by which to weight signals applied to antenna elements of an antenna assembly are selected from the downlink correlation channel matrix.

In the various aspects and implementations of various embodiments of the present invention, reduced computations, and corresponding computational time periods, are required to select the antenna pattern configuration to be exhibited by the antenna assembly relative to conventional manners by which to select the antenna pattern configurations. Improved operation of a communication system is thereby provided.

In these and other aspects, therefore, apparatus, and an associated method, is provided for a radio communication system having a first communication station and a second communication station. Data is communicated between the first and second communication stations. Data communication by the second communication station to the first communication station is effectuated upon a first channel. And, data communicated by the first communication station to the second communication is effectuated upon a second channel. The first communication station has an antenna array capable of forming an adaptively-selectable antenna pattern configuration. The antenna pattern configuration formed by the antenna array is selected responsive to indications of data communicated by the second communication station to the first communication station. A reformulator is coupled to receive the indications of the data communicated by the second communication station to the first communication station. The reformulator reformulates the indications into a vector representation of the indications. The vector representation includes a coefficient vector. A coefficient-vector calculator is operable responsive to formation of the vector representation by the reformulator. The coefficient-vector calculator calculates values of the coefficient vector forming a portion of the vector representation formed by the reformulator. A second-channel, channel characteristic calculator is coupled to receive indications of the values of the coefficient vector formed by the coefficient-vector calculator. The second-channel channel characteristic calculator calculates indications of characteristics of the second channel. The indications of the characteristics of the second channel are used to select the antenna pattern configuration.

In further aspects, therefore, additional apparatus, and associated method, is provided for a radio communication system having a first communication station and a second communication station between which data is communicated. Data communication by the second communication station to the first communication station is effectuated upon a first channel. And, data communication by the first communication station to the second communication station is effectuated upon a second channel. The first communication station has an antenna array capable of forming an adaptively-selectable antenna pattern configuration. The antenna pattern configuration formed by the antenna array is selected responsive to indications of data communicated by the second communication station to the first communication station. An angle determiner is coupled to receive indications of the data communicated by the second communication station to the first communication station. The angle determiner determines first channel communication angles of the data communicated by the second communication station to the first communication station. An associator is coupled to receive indications of the first-channel communication angles. The associator associates corresponding second-channel communication angles responsive to the first-channel communication angles. A transformer transforms values representative of the second-channel communication angles formed by the associator. Transforms formed by the transformer define indications of characteristics of the second channel. The indications of the characteristics of the second channel are used to select the antenna pattern configuration.

A more complete appreciation of the present invention and the scope thereof can be obtained from the accompanying drawings that are briefly summarized below, the detailed description of the presently preferred embodiments of the invention, and the appended claims.

DETAILED DESCRIPTION

Figure 1:
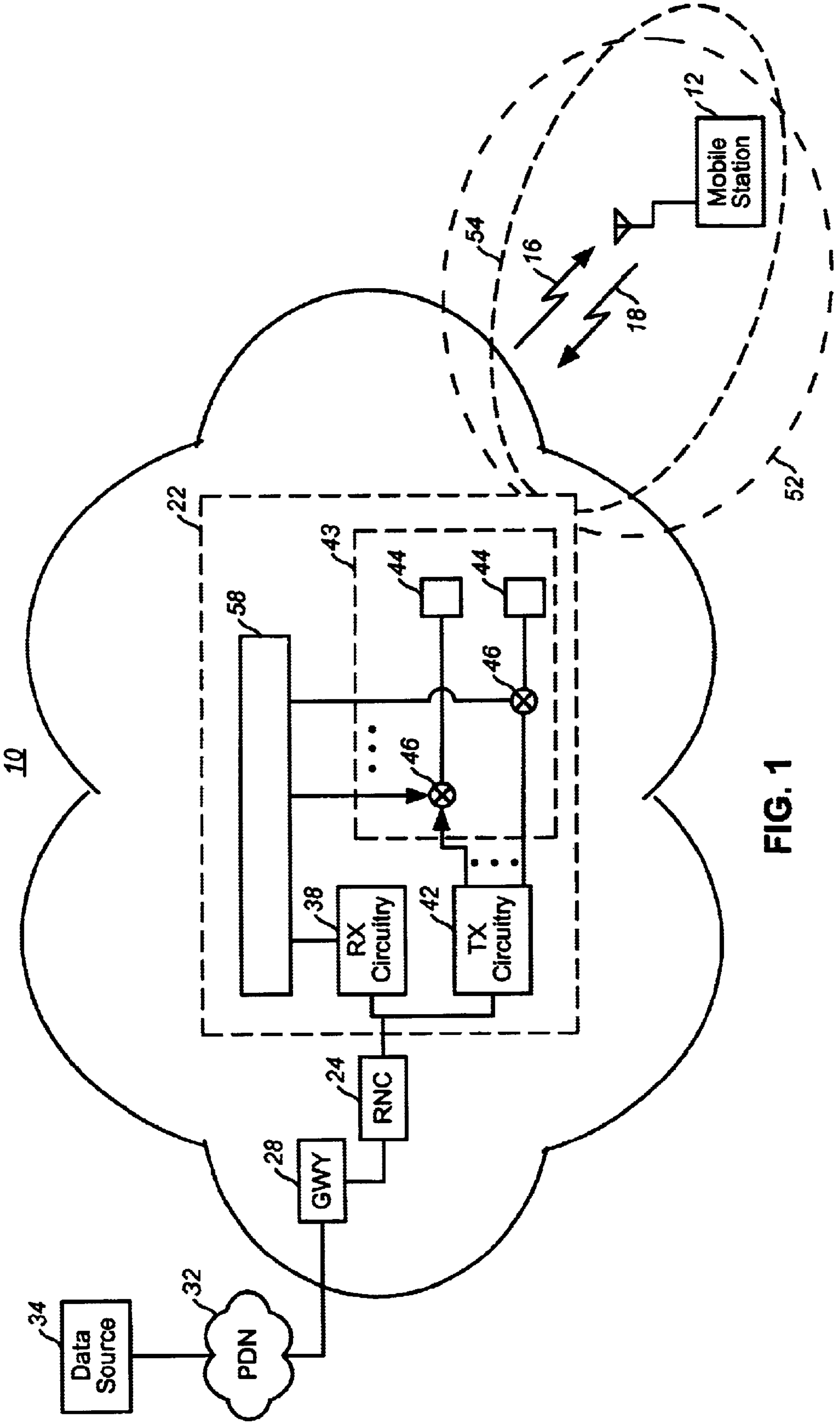
FIG. 1 illustrates a functional block diagram of a communication system in which an embodiment of the present invention is operable.

Referring first to FIG. 1, a communication system, shown generally at 10, provides for radio communications with mobile stations, of which the mobile station 12 is representative. In the exemplary implementation, the communication system 10 forms a cellular communication system operable pursuant to a cellular communication standard which provides for the effectuation of communication services with the mobile stations operable in the communication system. A communication service is effectuated with the mobile station 12, for instance, pursuant to a communication session in which data is communicated between the mobile station and a network part, here including a radio access network 14. Data to be communicated by the radio access network to the mobile station is communicated upon forward link, or downlink channels, here represented by the arrow 16 on a radio link extending between the radio access network and the mobile station. And, data to be communicated by the mobile station to the radio access network is communicated upon uplink, or reverse link, channels, here represented by the arrow 18. Thereby, two-way communication between the radio access network and the mobile station is permitted.

The radio access network 14 is here shown to include a base station system (BSS) that operates to transceive the data with the mobile station. The base station system is, in turn, coupled to a radio network controller (RNC) 24. And, the radio network controller is coupled to a radio gateway (GWY) 28.

The communication system further includes a packet data network (PDN) 32, such as the Internet, to which a correspondent node, here forming a data source 34, is coupled. The packet data network and the radio access network are coupled together by way of the gateway 28 of the radio access network. A communication path is formable between the data source 34 and the mobile station 12 by way of the packet data network, the radio access network, and the radio links upon which the forward and reverse links 16 and 18 are defined. Data sourced at the data source is communicated to the mobile station to effectuate a communication service pursuant to a communication session with the mobile station.

The base station system 22 includes receive circuitry 38 and transmit circuitry 42 operable, respectively, to receive and to transmit radio frequency signals communicated by, and to, the mobile station. The base station system includes an antenna assembly 43 having a plurality of antenna elements 44 and weighting elements 46. The antenna assembly is capable of generating a selectable antenna pattern configuration of which two exemplary pattern configurations are shown in the figure. An omni directional antenna pattern configuration 52 and an elongated antenna pattern configuration 54 are representative of two of the many antenna pattern configurations selectably caused to be exhibited by the antenna assembly. Pursuant to an embodiment of the present invention, the base station system further includes apparatus 58 of an embodiment of the present invention. The apparatus is coupled to the receive circuitry 38 to receive indications of data sent by the mobile station upon the reverse link channels to the radio access network. And, the apparatus operates upon such indications to generate antenna weighting values that are provided to individual ones of the weighting elements 46. Through appropriate weighting of the antenna elements 44, a desired antenna pattern configuration is caused to be exhibited by the antenna assembly. Through appropriate selection of the antenna pattern configuration, improved communication of data between the radio access network and the mobile station is possible.

Figure 2:
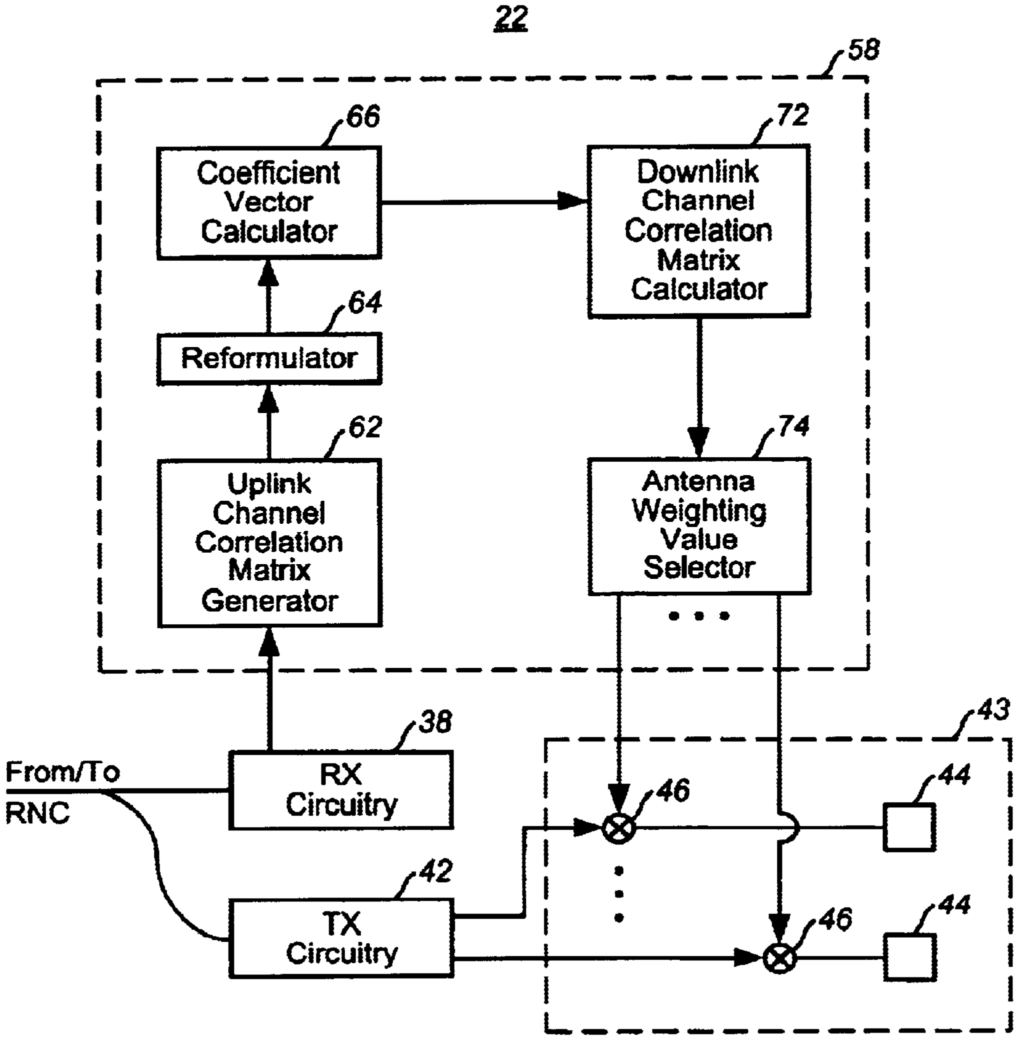
FIG. 2 illustrates a communication station that forms a portion of the communication system shown in claim 1, operable pursuant to an embodiment of the present invention.

FIG. 2 illustrates portions of the base station system 22 shown in FIG. 1 together with the apparatus 58 of an embodiment of the present invention. Here, again, the base station system is operable in a communication system that utilizes frequency division duplexing (FDD). The apparatus 58 is operable responsive to application thereto of indications of uplink data sent to the base station system by a mobile station to determine weighting factors to be applied to the weighting elements 46. Through appropriate weighting of the weighting elements, a desired antenna pattern configuration to be exhibited by the antenna assembly 43 is implemented to facilitate best effectuation of a communication service with the mobile station. The uplink data communicated to the base station system upon the uplink channel is communicated upon L multipaths. The multipaths are separated from each other in time by at least a chip spacing. The directionality of each multipath is modeled utilizing a spatial spectral density, with an associated mean angle of arrival and angular spread. The array for each of the L paths on the uplink channel is represented by:

$$y_{u_k}(f_u,l)=a_{u_k}(f_u,l)s_{u_k}(f_u)+y_I(f_u,l)+n_u(f_u,l)$$

Where:

$a_{u_k}(f_u,l)$ is a M length vector and contains the time varying M dimensional spatial signature vector, describing the $l^{th}$ path of the uplink channel of the desired user, $s_{u_k}(f_k)$ is the transmitted symbol, $y_I(f_u,l)$ are the transmitted signals from interfering mobiles, and $n_u(f_u,l)$ is the vector of additive noise.

The uplink spatial signature of the $l^{th}$ path of the data communicated upon the uplink channel is represented by:

$$a_{u_k}(f_u,l)=\int_\theta v(\theta\mid f_u g_{u_k}(\theta\mid f_u,l)\,d\theta$$

$$v(\theta\mid f_u)=\left[1,e^{j2\pi f_u\frac{z}{c}\sin\theta},\ldots,e^{j(M-1)2\pi f_u\frac{z}{c}\sin\theta}\right]^T$$

$$g_{u_k}(\theta\mid f_u,l)=\beta_{u_k}(\theta\mid f_u,l)e^{j\alpha_{u_k}(\theta\mid f_{u_k},l)}p_{u_k}(\theta,l)$$

where:

$v(\theta|f_u)$ is the standard far-field, narrow band point source steering vector associated with the uniform linear array, $\theta$ is the angle of incidence, z is the inter-element antenna spacing, c is the speed of light, and $g_{u_k}(\theta|f_u,l)$ is a spatial weighting function.

The spatial weighting function is a function of $\beta_{uk}(\theta|f_{uk},t)$ which refers to the unit variance Rayleigh distributed gain function and $\alpha_{uk}(\theta f_{uk},t)$, the uniformly distributed phase function and is $p_{u_k}(\theta,l)$, the spatial density function. We are neglecting the log-normal shadowing and the path loss terms. The first two terms of $g_{u_k}(\theta|f_u,l)$ are related to fast fading, while the third term is important in relation to beamforming, since it gives the directional nature of each Rayleigh path. It has the property that:

$$\sum_{l=\Theta}^{L-1}\int_{\theta\in\Theta}p_{u_k}^2(\theta,l)d\theta=1$$

This spatial function is common to both the uplink and the downlink.

$$p_{u_k}^2(\theta\mid l)\approx p_{d_k}^2(\theta\mid l)$$

The downlink spatial signature vector for the $l^{th}$ path can analogously be defined as:

$$a_{d_k}(f_d,l)=\int_\theta v(\theta\mid f_d)g_{d_k}(\theta\mid f_d,l)\,d\theta$$

Now, for beamforming, the channel correlation matrix can be constructed as the sum of the correlation matrices of each multipath:

$$R_{u_k}=E\left[\sum_{l=0}^{L-1}a_{u_k}(f_u,l)a_{u_k}^H(f_u,l)\right]$$

The apparatus 58 includes an uplink channel correlation matrix generator 62 that operates to construct the correlation matrices of each multipath according to the just-represented equation. Indications of the uplink channel correlation matrices are provided by the generator 62 to a reformulator 64. The reformulator operates to reformulate values representative of the uplink channel correlation matrices into a vector representation. Indications of the vector representation formed by the reformulator are then provided to a coefficient vector calculator 66. The coefficient vector calculator solves for values of channel coefficients. Indications of the channel coefficients calculated by the calculator 66 are provided to a downlink channel correlation matrix calculator 72. The calculator 72 utilizes the coefficient values formed by the calculator 66 in the formation of the downlink channel correlation matrices generated thereat. And, indications of the downlink channel correlation matrices formed at the calculator 72 are provided to an antenna weighting value selector 74. Selections made thereat are provided to the weighting elements 46.

Operation of the apparatus 58 advantageously utilizes commonalities of the uplink and downlink channels to select the antenna weighting values.

The uplink correlation matrix, $R_{u_k}$ can be represented by its Fourier series expansion as follows:

$$R_{u_k}=\sum_{n=-\infty}^{\infty}c_m T_{i,n},\text{ where}$$

$$T_{u,n}=\int_{-\pi/2}^{\pi/2}v(\theta/f_u)v^H(\theta/f_u)e^{jn\theta}\,d\theta$$

In the above equation, we are considering omni-directional antenna elements, but the treatment will not differ significantly for sectorized antennas.

The corresponding downlink channel correlation matrix for the desired user is given by:

$$R_{d_k}=\sum_{n=-\infty}^{\infty}c_n T_{d,n},\text{ where}$$

$$T_{d,n}=\int_{-\pi/2}^{\pi/2}v(\theta/f_d)v^H(\theta/f_d)e^{jn\theta}d\theta$$

Review of these equations indicates that the Fourier series coefficients $c_n$ do not change from uplink to the downlink. And, the matrices $T_{u,n}$ and $T_{d,n}$ can all be calculated offline, since they are not dependent on the signal.

The reciprocal transformation from $R_{u_k}$ to $R_{d_k}$ is performable by estimating the Fourier series coefficients based on the estimated $R_{u_k}$ and using the same to calculate $R_{d_k}$. The Fourier series expansion can be truncated to, say, 2P−1 terms, since it is not possible to estimate infinite terms. The more terms the expansion contains, the better the fidelity of the expansion.

Once the signal correlation matrix for the desired user has been obtained, the beamformer weights can be computed using several approaches. One approach is to maximize power to the desired user, while another approach is to constrain the power to the desired user, and minimize the interference. Both solutions involve computing the eigenvectors of the signal correlation matrix or the generalized eigenvectors of the system containing the signal and interference correlation matrices.

The signal correlation matrix can be expanded as a Fourier series, and the more terms used in the expansion, the better the approximation. Thus, in order to estimate the coefficients, at the calculator 66, the following equation is utilized:

$$c=\arg\min\left\|\hat{R}_{u_k}-\sum_{n=-P+1}^{P-1}c_n T_{u,n}\right\|_F^2$$

where ĉ is the vector of coefficients.

Prior to application, the system on the right-hand side is first converted by the reformulators 64 into a linear system involving matrix-vector multiplication as follows:

$$r_{stacked}=T_{stacked}c,\text{ where}$$

$r_{stacked}$ is an $M^2\times1$ vector, created by stacking the columns of R on top of each other, $T_{stacked}$ is a $M^2\times(2P-1)$ matrix obtained by suitable manipulations of the matrices $T_{u,n}$.

The solution for this system can be found to be as:

$\hat{c}=G^{-1}g$, where $G=T_{stacked}^H T_{stacked}$, which amounts to $[G]_{mn}=\text{trace}(T_{u,m-P}T_{u,n-P}), m,n\in\{1,\ldots,2P-1\}$, and $g=T_{stacked}^H r_{stacked}$ which amounts to $[g]_m=\text{trace}(R_{u_k}T_{u,m-P}), m\in\{1,\ldots,2P-1\}$ In the algorithm explained above, the matrix $G^{-1}$ can be computed offline, but the vector g has to be recomputed every time an update of the coefficients is needed. The complexity needed for computing g is given by $(2P-1)*M^2$ complex multiplications and additions. The computation of the coefficients involves an additional $(2P-1)^2$ complex multiplications.

An alternative approach to the above solution that is suited to a uniform linear array (ULA) is utilized. In signal correlation matrix in a ULA can be found to be Toeplitz in nature. In other words, the correlation between the first and second elements is the same as that between the second and third element and so on. This fact implies that there are now only 2M−1 unique elements in the vector $r_{stacked}$, M being the number of sensors. The RHS of the system (in Equation 2) is also suitably reduced in size. Thus, the system now becomes underdetermined, if we assume that P>M, i.e., we expand to at least 2M−1 terms of the Fourier series expansion. Now the solution becomes $$\hat{c}=T_{stacked}^H(T_{stacked}T_{stacked}^H)^{-1}r_{stacked}$$

In the above equation, it can be seen that the quantity $T_{stacked}^H(T_{stacked}T_{stacked}^H)^{-1}$ can be computed offline, and only the multiplication with $r_{stacked}$ has to be performed whenever the coefficients are to be updated. Hence the only computation is the (2P−1)*(2M−1) complex multiplies.

As reduced numbers of calculations are required to be performed to determine the antenna weighting values, quicker, and less computationally-intensive, selection of the antenna weightings are performed, thereby to permit improved operation of the communication system in which the apparatus 58 is implemented.

Figure 3:
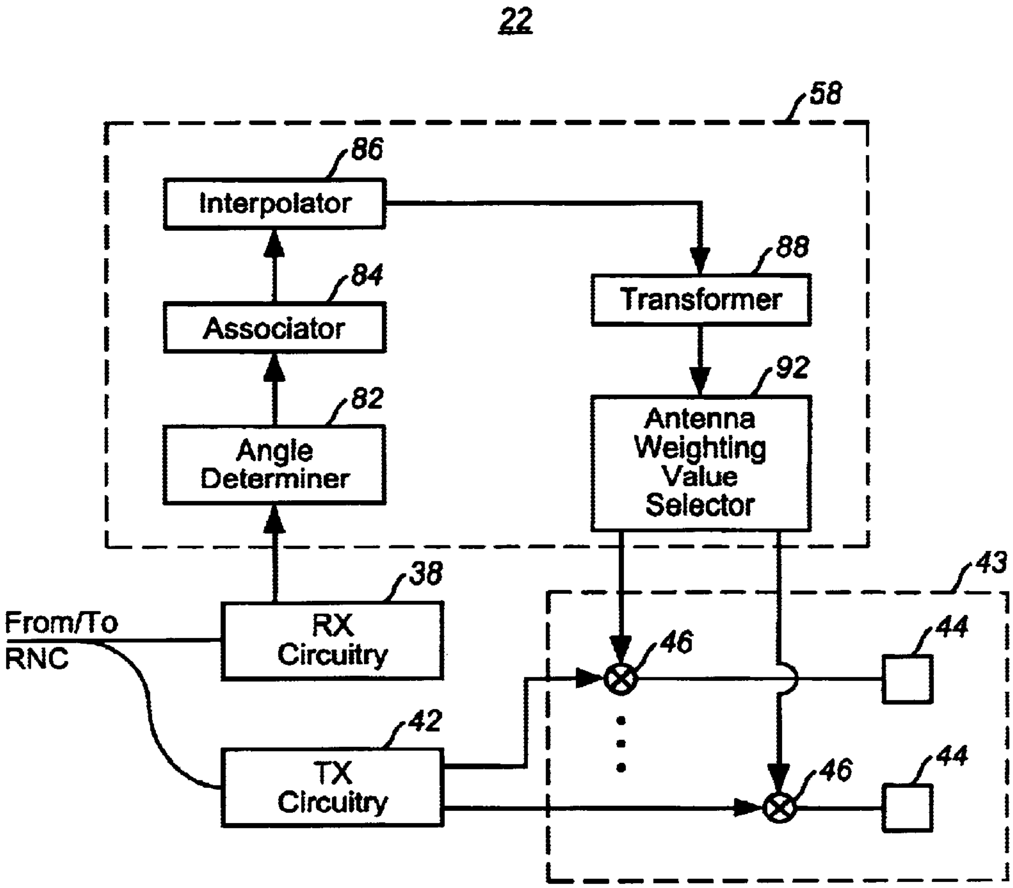
FIG. 3 illustrates a communication station analogous to that shown in FIG. 2, but here operable pursuant to an alternate embodiment of the present invention.

FIG. 3 illustrates the base station system 22 that includes the apparatus 58 of another embodiment of the present invention. Here, again, the apparatus is operable to select antenna weighting values by which to weight the antenna weighting elements 46, thereby to cause formation of the selected antenna pattern configuration exhibited by the antenna assembly 43. Here, again, advantage is taken of the commonality between the conditions of the uplink and downlink channels. That is to say, to obtain knowledge of the downlink channel parameters, operations are performed upon indications of channel conditions upon the uplink channel. In this implementation, the apparatus 58 utilizes an expansion, or contraction of a discrete Fourier transform (DFT) of a channel correlation matrix. As a discrete Fourier transform is efficiently implementable using a fast Fourier transform (FFT) algorithm, the antenna weighting values are obtainable with reduced computational complexity relative to conventional manners by which to obtain the weighting values. Here, the apparatus is shown to include an angle determiner 82 coupled to receive indications of data received by the receive circuitry of the base station system. The angle determiner determines incident angles of the data communicated upon the uplink channel to the base station system. Indications of the angles determined by the determiner are provided to an associator 84. The associator associates a downlink frequency to the uplink frequency and forms indications of associated downlink angles. The indications of the associated downlink angles are provided to an interpolator 86 operable to interpolate values of the angles to form equally-spaced values. The equally-spaced values are provided to a transformer 88 that operates to transform the values to a downlink correlation matrix. Then, an antenna weighting value selector 92 operates to select antenna weighting values by which the antenna weighting elements are to be weighted.

Consider a single path impinging on the antenna array at angle θ, measured from the line connecting the elements of the array as the reference. Let the uplink carrier frequency be $f_u$. The uplink spatial signature of the ray is given by $$v(\theta\mid f_u)=\left[1,e^{j2\pi f_u\frac{z}{c}\cos\theta},\ldots,e^{j(M-1)2\pi f_u\frac{z}{c}\cos\theta}\right]^T$$

z is the distance between consecutive elements of the uniform linear array, $f_u$ is the uplink frequency.

The channel correlation matrix on the uplink will be given by $$R_u=v(\theta/f_u)v^H(\theta/f_u)$$

When there are multiple paths, which is often the case, the matrix will be a summation of multiple terms, each having the form of the right-hand side of this equation. In the limit, $R_u$ will be an integral over all directions of arrival.

The downlink channel correlation matrix corresponding to the uplink described above, is given by $$R_d=v(\theta/f_d)v^H(\theta/f_d)$$

Denote the first column of $R_u$ as $r_{u,1}$. In fact, $r_{u,1}=v(\theta/f_u)$, and similarly on the downlink, $r_{d,1}=v(\theta/f_d)$. That is to say, they are simply complex sinusoids of differing frequencies, given by $\omega\omega_u,\omega_d$ respectively, given by:

$$\omega_u=2\pi f_u\frac{z}{c}\cos\theta,$$

$$\omega_d=2\pi f_d\frac{z}{c}\cos\theta$$

The problem of obtaining $R_d$ from $R_u$ has conventionally been solved using a Fourier series expansion of the continuous directional pattern of the signal. Utilization is made of the same set of coefficients with different modification factors based on the uplink and downlink frequencies.

Here, instead, the apparatus 58 uses a discrete Fourier transform (DFT) approach to the same problem. Discrete spatial samples are made available through the array elements.

In essence, the steps utilized include: transforming the column of the uplink correlation matrix to the frequency domain, redistributing the coefficients obtained form the transformation, in such a way that they appear to be obtained from sinusoids of a different frequency, performing the inverse Fourier transform to obtain an estimate of the column of the downlink correlation matrix, and constructing the full downlink correlation matrix based on the Toeplitz Hermitian property.

The DFT gives the frequency response of the vector $v(\theta/f_u)$, sampled at radial frequencies $$\left[0\frac{2\pi}{N}\cdots\frac{2\pi(N-1)}{N}\right].$$

Now, since the angular frequencies have shifted by a ratio equal to $$\alpha=\frac{f_d}{f_u},$$

the frequency of the complex sinusoid has now shifted from $\omega\omega_u$ to $\omega_d$. Suppose that $f_d>f_u(\alpha>1)$. Then, for all angles of arrive $$0<\theta<\frac{\pi}{2},$$

there will be a shift to the right in the spectrum, and for all frequencies $$\frac{\pi}{2}<\theta<\pi,$$

there will be a left shift in the spectrum (the effect is symmetric around broadside). In the case of $f_d>f_u$, the directions of the shifts will be reversed. Now, in effect, a new discrete spectrum is formed in which the frequency samples are unevenly spaced. The shifting of the spectral points can be defined by mapping of the indices [0,1, . . . ,(N−1)] to another set of indeces given by $$\left[0,1,2,\ldots,\left(\frac{N}{2}-1\right]\to\alpha\left[0,1,2\ldots,\left(\frac{N}{2}-1\right)\right],$$

$$\left[\frac{N}{2},\left(\frac{N}{2}+1\right),\ldots,(N-1)\right]\to(N-1)-\alpha\left[\left(\frac{N}{2}-1\right),\ldots,1,0\right]$$

Let this new unevenly spaced spectrum be called $\hat{X}_d$. In order to obtain the regularly spaced frequency domain samples for the downlink, $X_d$, which are necessary for performing an inverse Fourier transform, a simple "nearest neighbor interpolation" strategy is used.

An interpolation technique used by the interpolator is as follows: all N elements of $X_d$ are initialized to zero, for each frequency point in $\hat{X}_d$, indexed by l and denoted as $\hat{X}_d(l)$, given by the right hand sides of the above equation the distances to the nearest neighboring discrete points from the left hand side of the equation. Let the $l^{th}$ frequency point $\hat{X}_d$ be at a distance of p from point K of $X_d$, and (1−p) from point K+1, then, the coefficient $\hat{X}_d(l)$ is distributed as:

$$X_d(K)=X_d(K)+(1-P)\hat{X}_d(l)$$

$$X_d(K+1)=X_d(K+1)+p\hat{X}_d(l)$$

Once $X_d$ has been obtained, the inverse DFT is performed. Once the first column of the channel correlation matrix on the downlink is obtained, the other columns can be obtained using the property that the matrix is Toeplitz Hermitian.

There are only M elements in $r_{u,l}$, M being the number of elements of the antenna array. This restricts the DFT to M elements (N=M), and the angular frequency resolution to $$\frac{1}{M}.$$

The performance obtained by the method described above is poor at such resolution. In order to increase the resolution, the vector $r_{u,l}$ is zero-padded, so that its length is N>M. Zero-padding is the process by which zeros are appended to increase the length of the vector. The deleterious effect of zero-padding is that it introduces a filtering effect, the frequency response of the filter being a sinc function, the time domain impulse response is a rectangular window.

Figure 4:
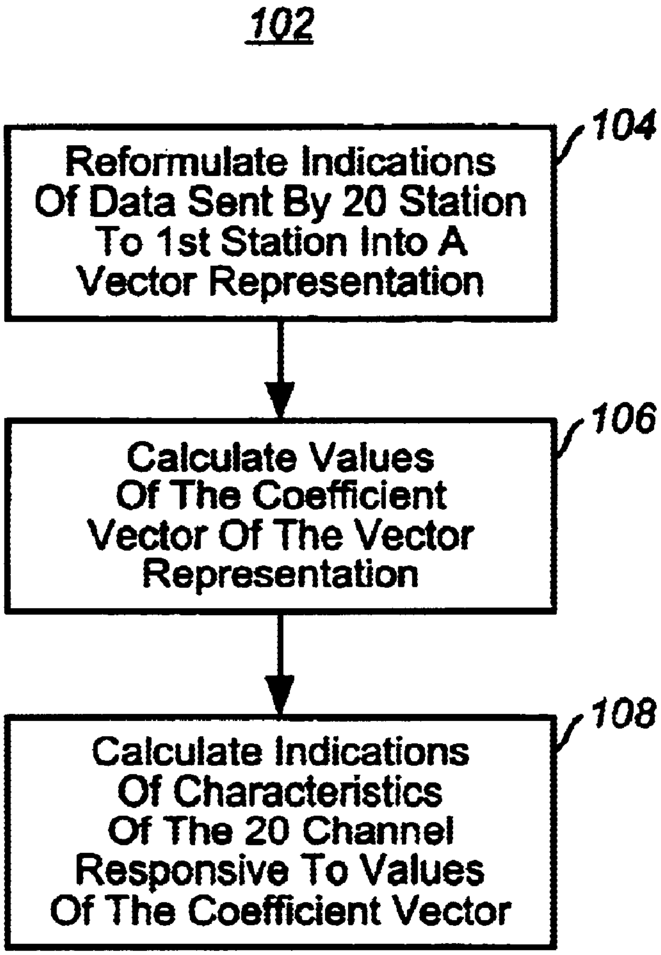
FIG. 4 illustrates a method flow diagram listing the method of operation of an embodiment of the present invention.

FIG. 4 illustrates a method, shown generally at 102, of the method of operation of an embodiment of the present invention. The method operates to facilitate selection of an antenna pattern configuration to be exhibited by an antenna array. Selection is made responsive to indications of data communicated by a second communication station to a first communication station.

First, and as indicated by the block 104, the indications of the data communicated by the second communication station to the first communication station is reformulated into a vector representation of the indications. The vector representation includes a coefficient vector. Then, and as indicated by the block 106, the values of the coefficient vector of the vector representation are calculated. And, as indicated by the block 108, indications of the calculations of characteristics of the second channel are calculated responsive to the values of the coefficient vector. The indications of the characteristics of the second channel are used to select the antenna pattern configuration.

Thereby, as computations required to select the antenna pattern configuration are reduced relative to conventional manners by which the antenna pattern configuration is selected, quicker selection of the antenna pattern characteristics is possible, and, as a result, improved communication operation of the communication system in which an embodiment of the present invention is implemented is possible.

A more complete appreciation of the present invention and the scope thereof can be obtained from the accompanying drawings that are briefly summarized below (Balaji's comment: are they summarized below?), the following detailed description of the presently-preferred embodiments of the present invention, and the appended claims.

What is claimed is:

1. Apparatus for a radio communication system having a first communication station with which data is communicated, data communication to the first communication station effectuated upon a first channel and data communication by the first communication station effectuated upon a second channel, the first communication station having an antenna array capable of forming an adaptively-selectable antenna pattern configuration, said apparatus for selecting the antenna pattern configuration formed by the antenna array responsive to indications of data communicated to the first communication station, said apparatus comprising:

a first channel correlation matrix generator adapted to receive the indications of the data communicated to the first communication station, said first channel correlation matrix for generating a first-channel correlation matrix, the first-channel correlation matrix defined in terms of first Fourier series coefficients of first values;

a reformulator coupled to receive the indications of the first-channel correlation matrix generated by said first-channel correlation matrix generator, said reformulator for reformulating the indications into a vector representation of the first-channel correlation matrix, the vector representation including a coefficient vector;

a coefficient-vector calculator operable responsive to formation of the vector representation by said reformulator, said coefficient-vector calculator for calculating values of the coefficient vector forming a portion of the vector representation formed by said reformulator;

a second-channel, channel characteristic calculator coupled to receive indications of the values of the coefficient vector formed by said coefficient-vector calculator, said second-channel channel characteristic calculator for calculating indications of characteristics of the second channel, the indications of the characteristics of the second channel, also defined in terms of the first Fourier series coefficients at the first values, used to select the antenna pattern configuration.

2. The apparatus of claim 1 wherein the radio communication system comprises a frequency division duplex (FDD) system, wherein the first channel is defined about a first frequency and the second channel is defined about a second frequency, and wherein the indications of the data responsive to which said first-channel correlation matrix generates the first-channel correlation matrix.

3. A The apparatus of claim 1 wherein said reformulator reformulates the first-channel, channel correlation matrix into a single-column matrix, the single-column matrix forming the coefficient vector.

4. The apparatus of claim 1 wherein said coefficient vector calculator calculate optimal values, according to a selected optimization scheme, of the coefficient vector.

5. The apparatus of claim 4 wherein the optimization scheme comprises a minimization scheme.

6. The apparatus of claim 1 wherein the indications of the characteristics of e second channel formed by said second-channel, channel characteristic calculator comprise a second-channel correlation matrix.

7. The apparatus of claim 6 further comprising an antenna pattern configuration selector coupled to said second-channel, channel characteristic calculator, said antenna configuration selector for selecting, responsive to the indications of the characteristic of the second channel calculated by said second-channel characteristic calculator, the antenna pattern.

8. The apparatus of claim 7 wherein the antenna array comprises a plurality of antenna devices, each antenna device having a selectable weighting associated therewith and wherein said antenna pattern configuration selector selects weightings associated with the antenna devices.

9. A method for communicating in a communication system having a first communication station and a second communication station between which data is communicated, data communication by the second communication station to the first communication station effectuated upon a first channel and data communication by the first communication channel to the second communication station effectuated upon a second channel, the first communication station having antenna array capable of forming an adaptively-selectable antenna pattern configuration, said a method for selecting the antenna pattern configuration formed by the antenna array responsive to indications of data communicated by the second communication station to the first communicated, said method comprising:

generating a first-channel correlation matrix responsive to indications of the data communicated to the first communication station, the first-channel correlation matrix defined in terms of first Fourier series coefficients of first values;

reformulating the first-channel correlation matrix communicated to the first communication station into a vector, the vector representation including a coefficient vector;

calculating values of the coefficient vector of the vector representation formed during said operation of reformulating;

calculating indications of characteristics of the second channel responsive to the values of the coefficient vector, the indications of the characteristics of the second channel used to select the antenna pattern configuration, the characteristics of the second channel also defined in terms of the first Fourier series coefficients of the first values.

10. Apparatus for a radio communication system having a first communication station and a second communication station between which data is communicated, data communication by the second communication station to the first communication station effectuated upon a first channel and data communication by the first communication station to the second communication station effectuated upon a second channel, the first communication station having an antenna array capable of forming an adaptively-selectable antenna pattern configuration, said apparatus for selecting the antenna pattern configuration formed by the antenna array responsive to indications of data communicated by the second communication station to the first communication station, said apparatus comprising:

an uplink channel correlation matrix former adapted to receive indications of incident angles at which data is communicated to the first communication station, said channel correlation matrix representative of the uplink channel;

a downlink channel correlation matrix former adapted to receive discrete Fourier-transformed representations of the uplink channel correlation matrix former by said uplink channel correlation former, said downlink channel correlation matrix former forming a downlink correlation matrix; and an antenna weighting value selector adapted to receive indications of the downlink channel correlation matrix formed by said downlink channel correlation matrix former, said antenna weighting value selected for selecting antenna weights of antennas of the antenna array, thereby to select the antenna pattern configuration thereof.

* * * * *